(12) United States Patent
Miller et al.

(10) Patent No.: US 6,752,594 B2
(45) Date of Patent: Jun. 22, 2004

(54) SPLIT BLADE FRICTIONAL DAMPER

(75) Inventors: Jeff Harley Miller, Simi Valley, CA (US); Gary Alan Davis, Camarillo, CA (US)

(73) Assignee: The Boeing Company, Seattle, WA (US)

(*) Notice: Subject to any disclaimer, the term of this patent is extended or adjusted under 35 U.S.C. 154(b) by 94 days.

(21) Appl. No.: 10/071,369

(22) Filed: Feb. 7, 2002

(65) Prior Publication Data

US 2003/0147748 A1 Aug. 7, 2003

(51) Int. Cl.$^7$ ................................................. F01D 5/26
(52) U.S. Cl. .................... 416/1; 416/96 A; 416/231 B; 416/500
(58) Field of Search ...................... 415/115; 416/96 A, 416/231 B, 232, 233, 248, 500, 1

(56) References Cited

U.S. PATENT DOCUMENTS

| | | |
|---|---|---|
| 2,405,283 A | 8/1946 | Birmann |
| 2,664,240 A | 12/1953 | Gorton |
| 2,999,669 A | 9/1961 | McGinnis |
| 3,867,068 A | 2/1975 | Corsmeier et al. |
| 3,958,905 A | 5/1976 | Wood |
| 3,966,357 A | 6/1976 | Corsmeier |
| 4,183,456 A | 1/1980 | Schilling et al. |
| 4,183,719 A | 1/1980 | Bozung |
| 4,268,223 A | 5/1981 | Anner et al. |
| 4,329,119 A | 5/1982 | Baskin |
| 4,383,854 A | 5/1983 | Dembowski et al. |
| 4,484,859 A | 11/1984 | Pask et al. |
| 4,615,659 A | 10/1986 | Sidransky |
| 4,684,326 A | 8/1987 | Wassell et al. |
| 4,722,668 A | 2/1988 | Novacek |
| 4,776,763 A | 10/1988 | Light |
| 4,872,812 A | 10/1989 | Hendley et al. |
| 5,052,890 A | 10/1991 | Roberts |
| 5,165,860 A | 11/1992 | Stoner et al. |
| 5,226,784 A | 7/1993 | Mueller et al. |
| 5,232,344 A | 8/1993 | El-Aini |
| 5,302,085 A | 4/1994 | Dietz et al. |
| 5,407,321 A | 4/1995 | Rimkunas et al. |
| 5,498,137 A | 3/1996 | El-Aini et al. |
| 5,645,402 A | 7/1997 | Cornelius et al. |
| 5,820,343 A | 10/1998 | Kraft et al. |
| 6,283,707 B1 | 9/2001 | Chin |

*Primary Examiner*—Edward K. Look
*Assistant Examiner*—Dwayne J. White
(74) *Attorney, Agent, or Firm*—Alston & Bird LLP

(57) ABSTRACT

An improved frictional damper for a rotor blade is positioned inside a cavity in the airfoil section of the blade. The cavity includes an elongated, generally radially-extending opening that divides the airfoil into two sections and an elongated opening transverse to and intersecting the radial opening. A damper placed within the cavity frictionally engages the resulting sections of the airfoil, thereby reducing the vibratory stresses on the blade as a whole.

21 Claims, 7 Drawing Sheets

SPLIT BLADE FRICTIONAL DAMPER

FIELD OF THE INVENTION

This invention relates to rotor blades and specifically to the mechanical damping of vibratory energy in the blades of rotor assemblies during operation.

BACKGROUND OF THE INVENTION

Rotor assemblies are used in a variety of turbo-machines, such as turbines, compressors and the like. Regardless of the application, rotor assemblies generally include a disk mounted on a rotating shaft with a plurality of blades extending radially outward around the circumference of the disk. Rotor blades typically consist of a root portion in contact with the disk and an airfoil portion extending radially therefrom. Flow of the working fluid, i.e. air for jet engines, across the airfoil portion imparts a force upon the blades and results in rotation of the shaft. Blades may be manufactured as an integral component of the disk (blisk-type blades) or as separate components (mechanically attached blades). Mechanically attached blades are generally secured to the disk by the interlocking engagement of a dovetail root portion of the blade with a complementary dovetail slot in the disk, thereby preventing separation of the blade from the disk during operation.

During operation, fluid forces induce vibratory stresses on the blades, resulting in high cycle fatigue and potential failure of the blades. Dampers, commonly frictional dampers, are utilized to reduce the magnitude of these dynamic stresses, thereby increasing operational life of the blades.

Many conventional frictional damper designs are known. Blade-to-blade frictional dampers, located in the space between circumferentially adjacent blades, often near the blade root or the blade tip, are common. Blade-to-blade dampers are held in place by any of various known retaining means, such as a damper chamber or tip shroud. This prevents the damper from separating from its adjacent blades, but also allows some movement of the damper during operation for frictional damping. During operation, centrifugal forces urge the damper into frictional contact with its adjacent blades. This contact reduces the relative motion between the adjacent blades, thereby reducing the vibratory stresses on the blades during operation. Frictional damping is effective at any frequency so long as there exists relative motion between the damper and the blade. Exemplary blade-to-blade dampers are shown in U.S. Pat. No. 5,226,784 entitled "Blade Damper" issued to Mueller et al. on Jul. 13, 1993; and U.S. Pat. No. 4,722,668 entitled "Device for Damping Blade Vibrations in Turbo-Machines" issued to Novacek on Feb. 2, 1988, incorporated herein by reference.

Blade-to-ground frictional dampers are also well known in the art. Blade-to-ground dampers are placed between the turbine blade and an object secured to the disk. Frictional contact of the damper between the blade and the relatively stationary object similarly reduces the vibratory stresses on the blade. An exemplary blade-to-ground damper is shown in U.S. Pat. No. 5,052,890 entitled "Device for Damping Vibrations in Turbomachinery Blades" issued to Roberts on Oct. 1, 1991, incorporated herein by reference.

Also known in the art are internal dampers that are placed within a cavity inside the blade. These dampers similarly reduce vibratory stresses on the blade through frictional contact with an inner surface of the blade. Exemplary internal blade dampers are shown in U.S. Pat. No. 5,820,343 entitled "Airfoil Vibration Damping Device" issued to Kraft et al. on Oct. 13, 1998; U.S. Pat. No. 5,407,321 entitled "Damping Means for Hollow Stator Vane Airfoils" issued to Rimkunas et al. on Apr. 18, 1995; and U.S. Pat. No. 2,999,669 entitled "Damping Apparatus" issued to McGinnis on Sep. 12, 1961, all incorporated herein by reference.

Conventional frictional dampers suffer from several disadvantages. For example, dampers placed between blades are often difficult to install and remove. Also, many dampers placed between blades require the addition of a shroud or some other means to retain the damper during operation, which increases the weight of the blade. This increases the stresses experienced by the blade and can reduce operational life. Further, blade-to-blade and blade-to-ground frictional dampers are exposed to the harsh, corrosive environment of the working fluid. Damper corrosion compromises the effectiveness of the damper. Severe damper corrosion may allow the damper to break away from its retaining means, potentially damaging downstream components.

It is therefore desirable to develop a damper that is located outside the path of the working fluid that is easy to install and does not significantly increase the weight of the blade. Although internal dampers are located outside the path of the working fluid and most do not add significant weight to the blade, existing rotor blades, particularly blisk blades, may not be easily retrofitted with conventional internal damper designs. Also, installation and removal of conventional internal damper designs is difficult. Further, the relative motion between the blade and most internal dampers is generally minimal, limiting the effectiveness of the internal dampers.

SUMMARY OF THE INVENTION

In order to provide improved mechanical damping of rotor blade vibrations, the present invention provides a split-blade frictional damper that is positioned in a cavity defined by the body of the airfoil portion of the blade. The cavity has a generally radial elongated opening that extends entirely through the circumferential dimension of the airfoil and from the tip of the airfoil radially inward a specified distance, such as more than fifty percent of the height of the body. The elongated radial opening generally lies in a plane perpendicular to the axis of rotation of the rotor assembly but may be offset from this plane. This radial opening divides the airfoil portion of the blade into two distinct airfoil sections, each capable of motion relative to the other section. The cavity also may include an elongated opening transverse to and intersecting the radial opening, generally above the midpoint of the elongated radial opening. Typically, the elongated transverse opening lies in a plane parallel to the axis of rotation of the rotor assembly but may be offset from this plane. The transverse opening may, but need not, extend entirely through the circumferential dimension of the airfoil.

When the airfoil sections vibrate relative to one another, the frictional contact of the damper with the airfoil sections reduces this vibration and hence the stress on the blade as a whole. Thus, the portion of the damper in the elongated transverse opening has sufficient surface area to provide adequate frictional damping. The cross section of the damper is complementary with the cross section of the cavity thereby preventing passage of the working fluid through the cavity. Flow of the working fluid through the cavity reduces the flow across the surface of the blade and, therefore, the efficiency of the blade.

BRIEF DESCRIPTION OF THE DRAWINGS

Figure 1:
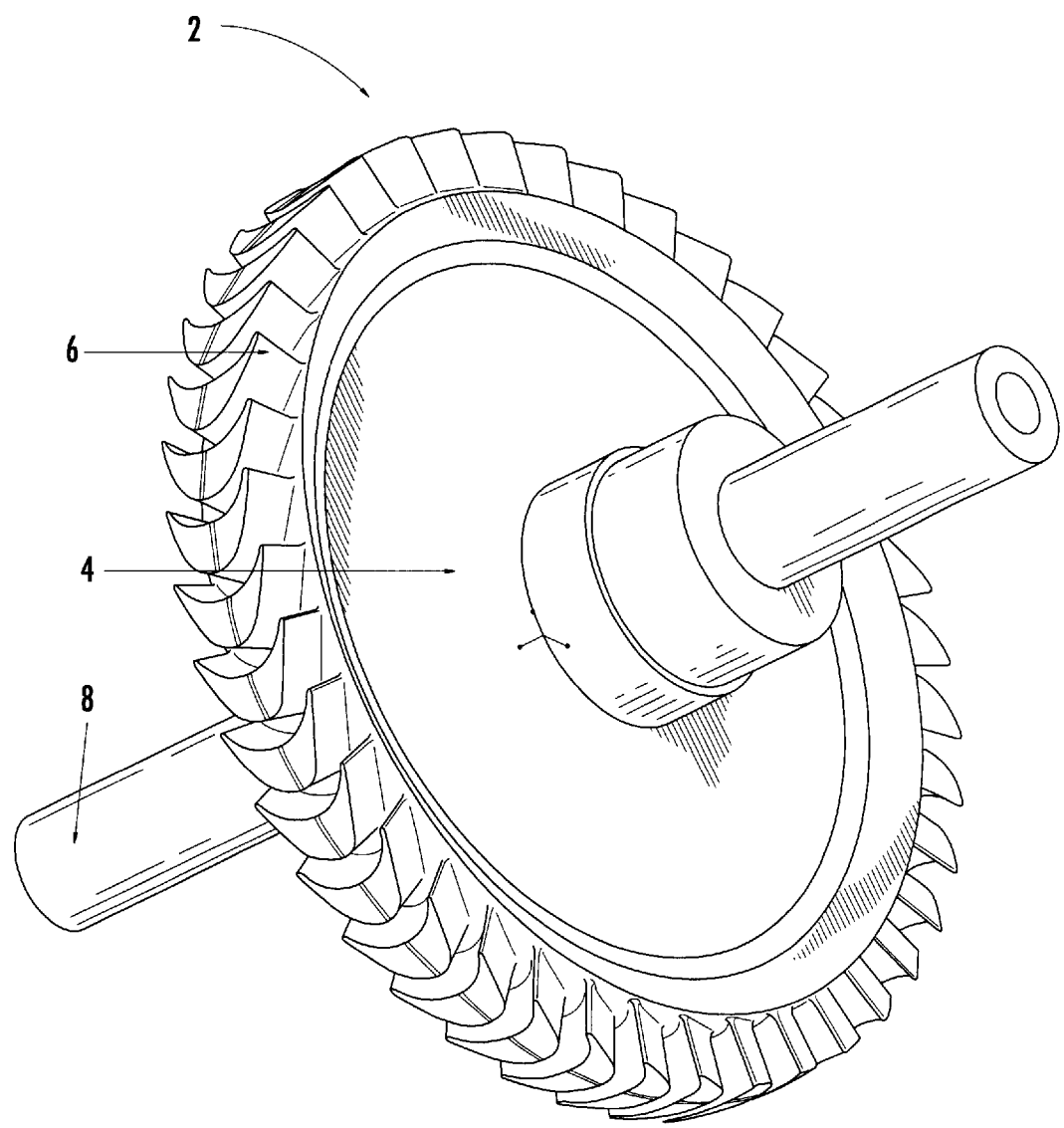
Figure 2:
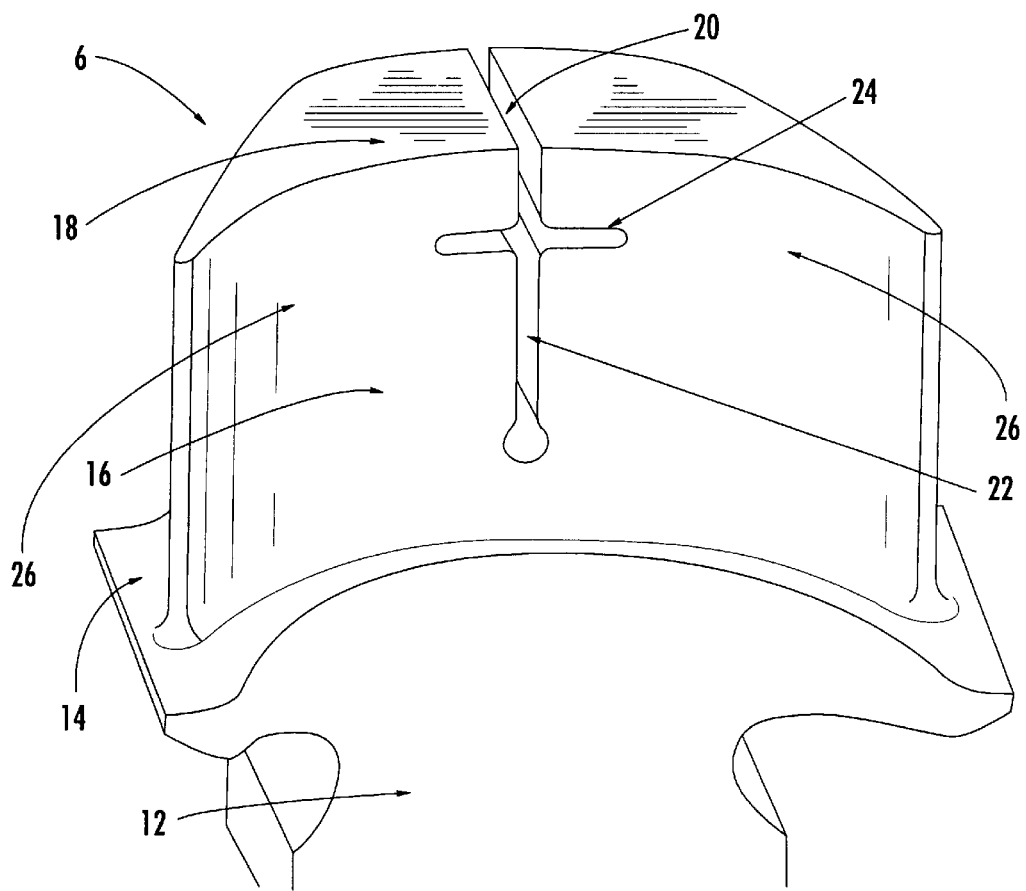
Figure 3A:
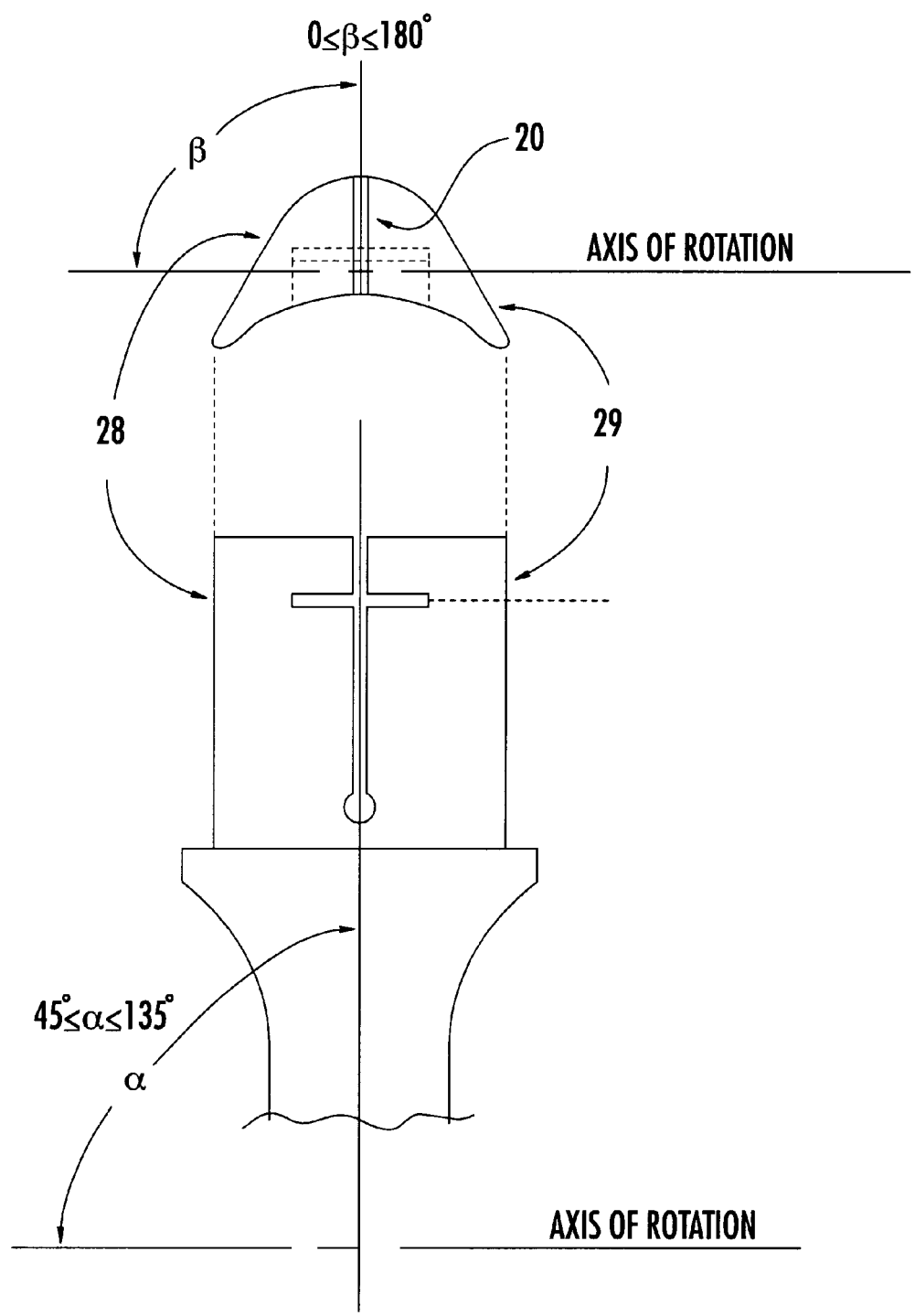
Figure 3B:
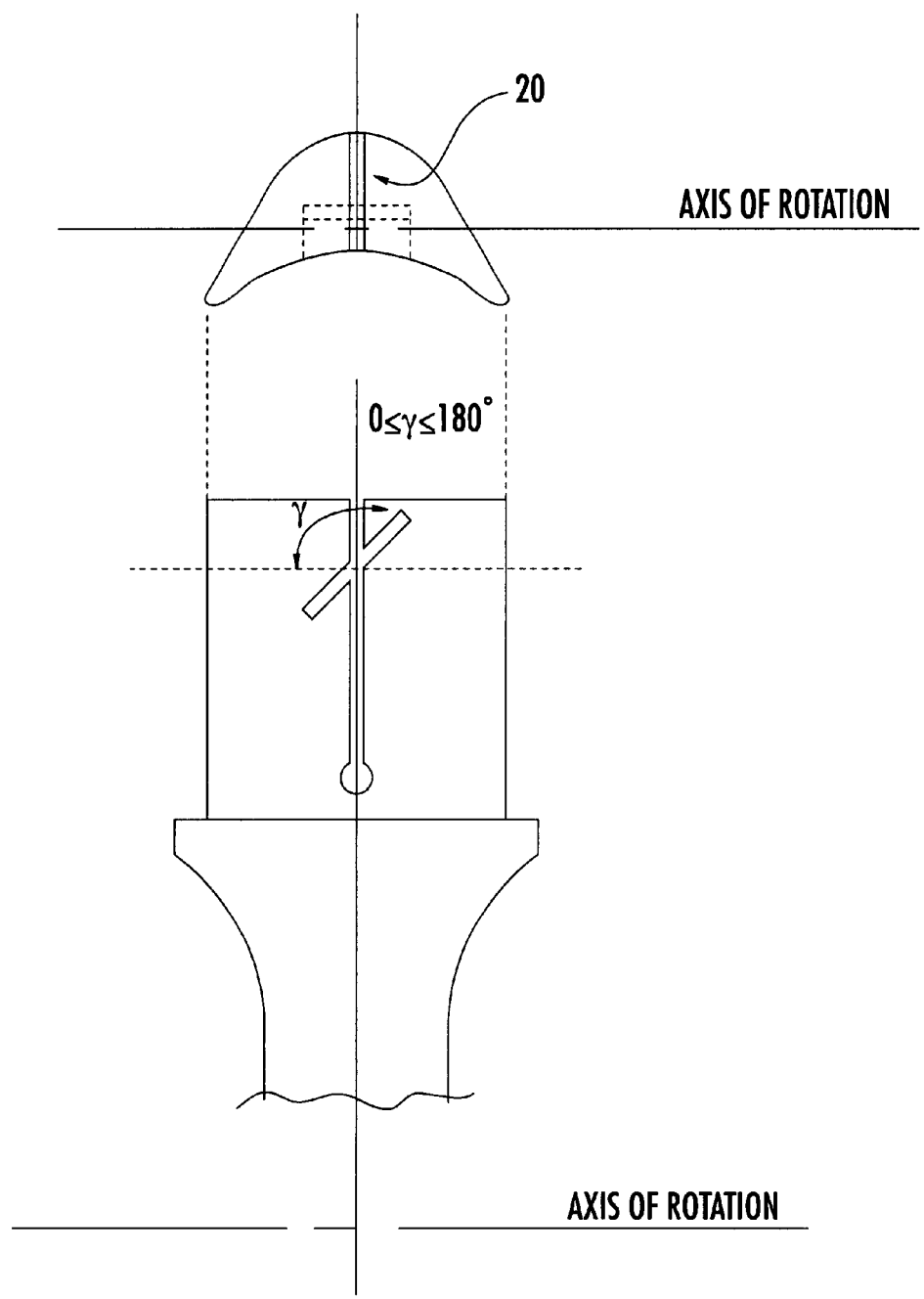
Figure 3C:
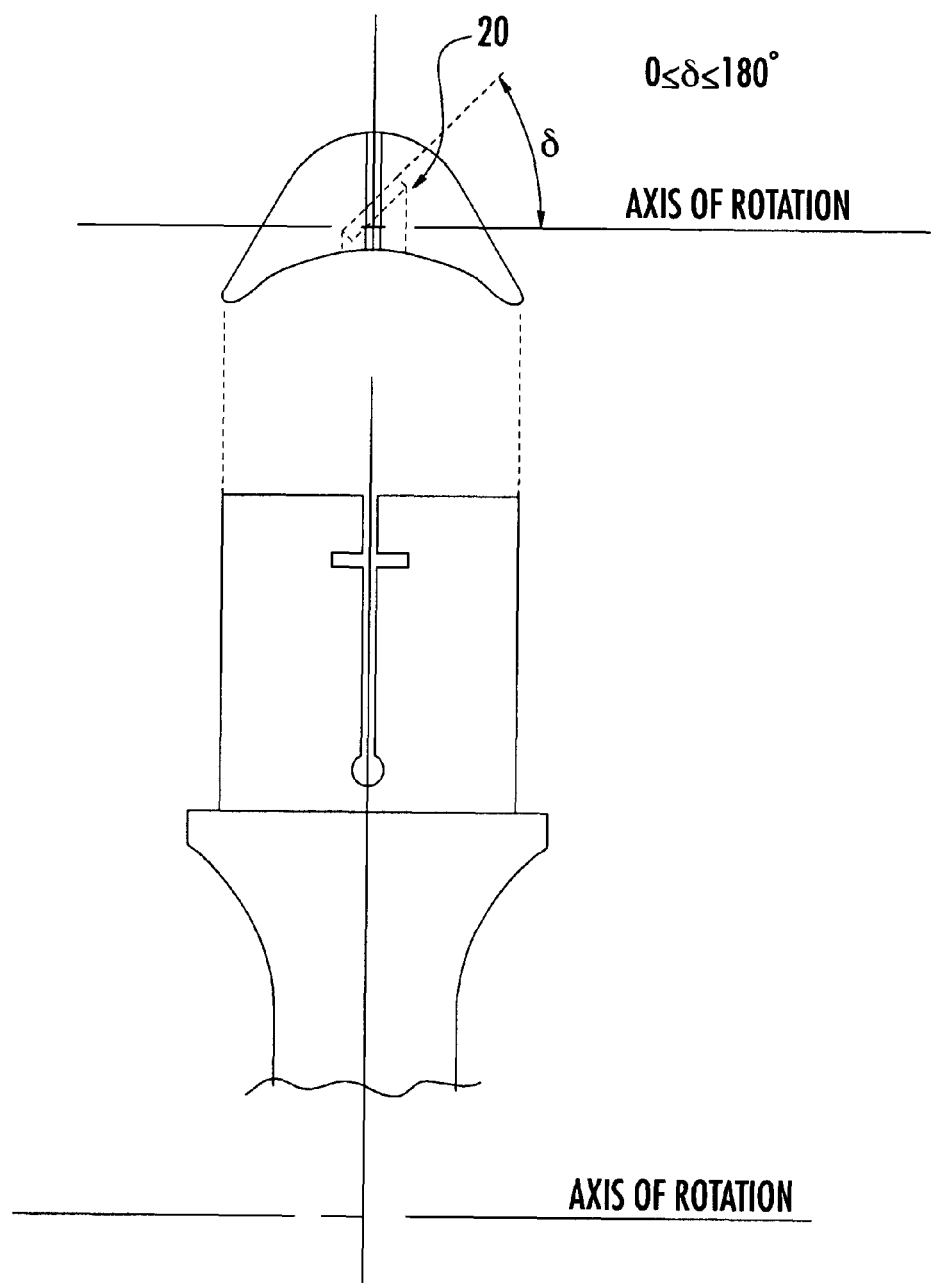
Figure 3D:
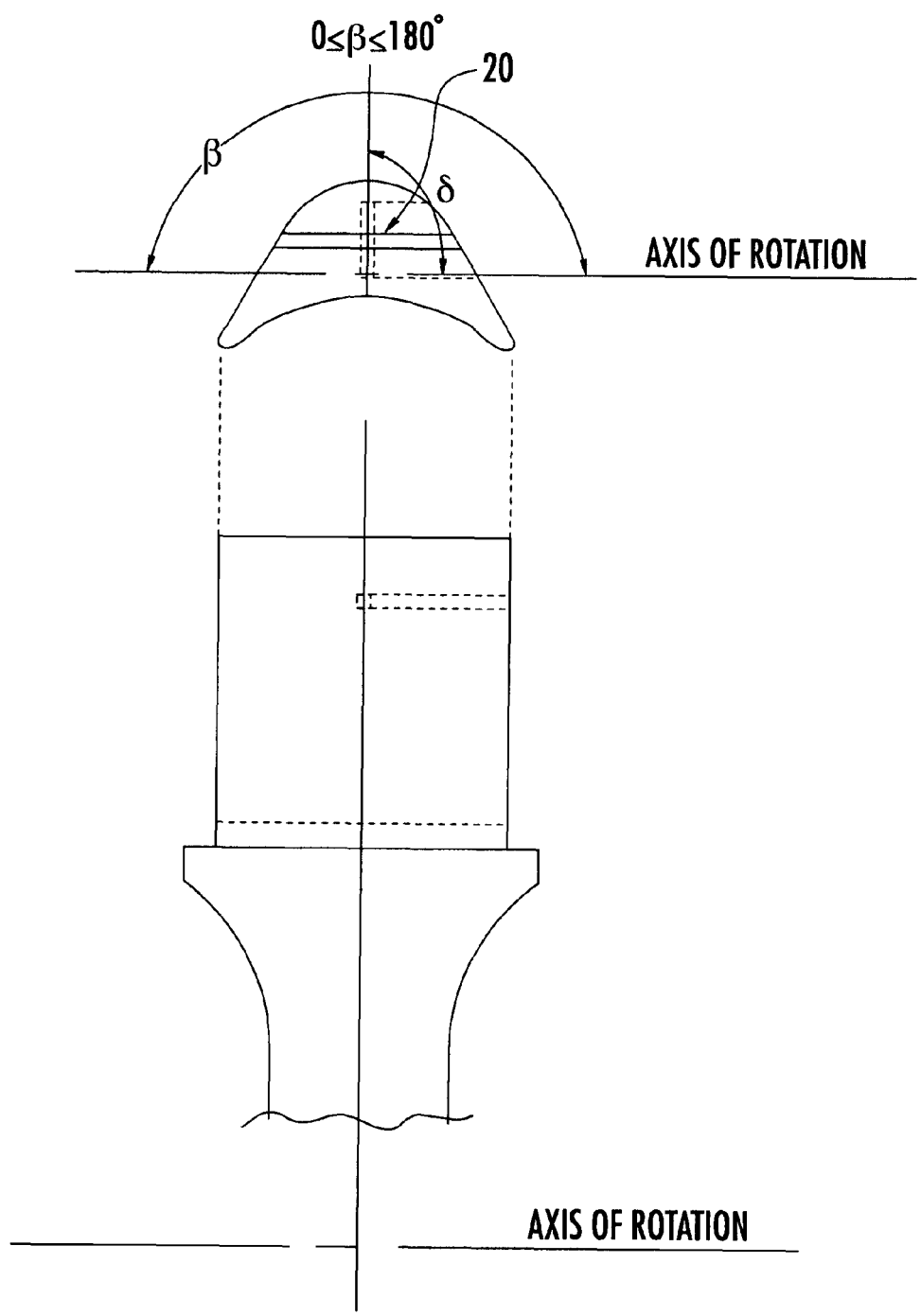
Figure 4:
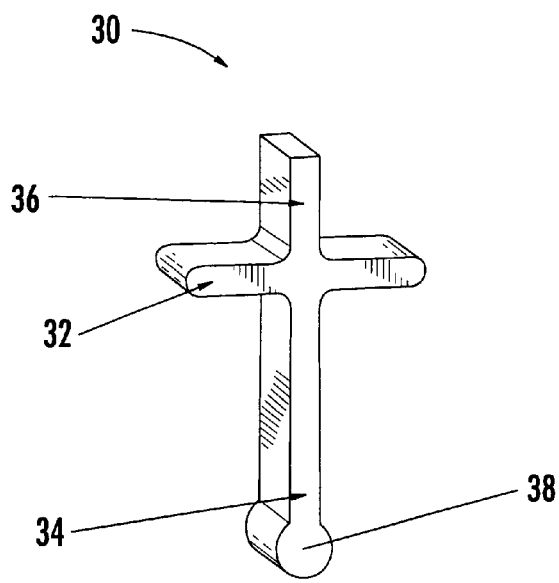
Figure 5:
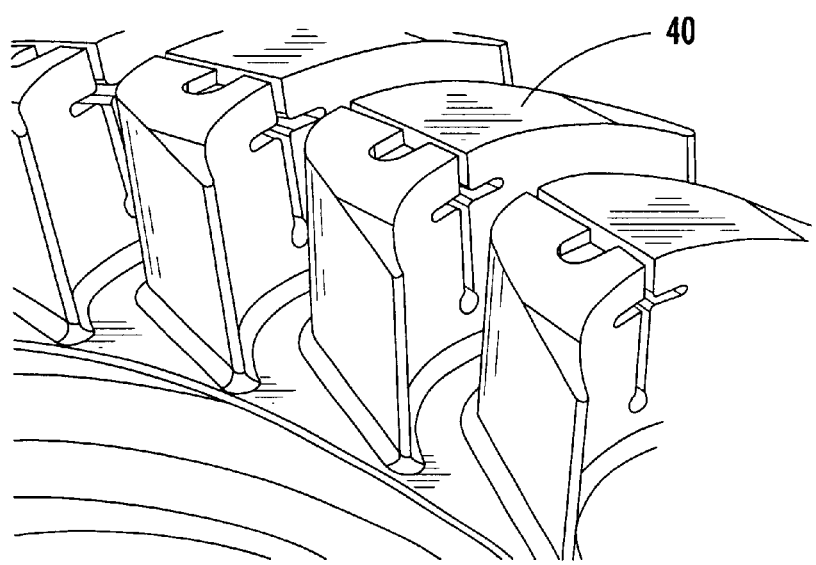

Having thus described the invention in general terms, reference will now be made to the accompanying drawings, which are not necessarily drawn to scale, and wherein:

FIG. 1 shows a perspective view of a rotor assembly configured with blades according to one embodiment of the present invention;

FIG. 2 shows a blade according to one embodiment of the present invention;

FIG. 3a shows a sectional view of a blade according to one embodiment of the present invention;

FIG. 3b shows a sectional view of an embodiment of the present invention in which the transverse opening is rotated from a radial plane;

FIG. 3c shows a sectional view of an embodiment of the present invention in which the transverse opening is rotated from an axial plane;

FIG. 3d shows a sectional view of an embodiment of the present invention in which the generally radial opening is rotated from a circumferential plane and the transverse opening is rotated from an axial plane;

FIG. 4 shows a perspective view of a split-blade frictional damper according to one embodiment of the present invention; and FIG. 5 is a perspective view of a portion of the rotor assembly of FIG. 1 depicting the blade in more detail.

DETAILED DESCRIPTION OF THE INVENTION

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a rotor assembly 2 consisting of a disk 4 with a plurality of circumferentially-disposed, generally radially-extending blades 6 according to the present invention. The disk is fixed to a shaft 8 about which the rotor assembly rotates during operation.

The rotor assembly can be used in a wide variety of turbo-machinery including turbines, compressors and the like. As can be seen more clearly in FIG. 2, typical blisk blade construction consists of a disk portion 12 and art airfoil portion 16. Although a blisk blade is shown, the present invention is also advantageous for use with mechanically attached blades. A mechanically attached blade would also have a dovetail root portion, sometimes referred to as a firtree, which fits into a slotted section on the rim of the disk. The slotted section is constructed with the same profile as the dovetail root portion so that the blade is held firmly in place during operation. The airfoil portion of either blade type is suitably shaped in a well known manner, typically with at least one convex surface and at least one concave surface, so as to efficiently extract energy from the working fluid as it flows across the blade, thereby imparting rotary motion to the rotor. That part of the airfoil portion most distant from the shaft, i.e. the distal portion, is called the tip 18.

The airfoil portion of each blade defines a damper cavity 20. Although the cavity shown has a cross-shaped cross section, the cavity may have any suitable cross section. Damper cavity 20 is preferably formed by the intersection of an elongated radial opening 22 oriented generally in a radial direction and an elongated transverse opening 24 oriented generally in an axial direction.

The generally radial opening 22 extends radially inward from the tip 18 of the airfoil a distance sufficient to allow relative motion between the resulting two airfoil sections 26, generally at least fifty percent of the radial length of the airfoil portion. In one advantageous embodiment, the generally radial opening is coplanar with the disk of the rotor assembly defining right angles $\alpha$ and $\beta$, in the radial and circumferential planes, respectively, as shown in FIG. 3a. However, the generally radial opening may be offset up to approximately forty-five degrees from the radial plane such that angle $\alpha$ is in the range 45–135 degrees.

The generally radial opening 22 may also be offset up to ninety degrees from the circumferential plane, such that $\beta$ is in the range 0–180 degrees. Regardless of the angle chosen, the generally radial opening extends completely across the tip of the blade. In other words, the generally radial opening extends circumferentially from concave surface to convex surface of the airfoil portion or, alternatively, extends axially from the input, or leading, edge 28 of the airfoil to the output, or trailing, edge 29 of the airfoil.

The transverse opening 24 is generally in a plane parallel to the axis of rotation, as shown in FIG. 3a. As with the generally radial opening, the transverse opening may be offset or inclined from this plane in any dimension or all three dimensions. For example, the transverse opening may be offset from this plane up to ninety degrees with respect to the axis of rotation such that angle $\gamma$, shown in FIG. 3b, is in the range 0–180 degrees. The transverse opening may also be inclined such that angle $\delta$, shown in FIG. 3c, varies in the range 0–180 degrees. In this configuration, angle $\gamma$ may remain zero degrees or may vary within the range 0–180 degrees. FIG. 3d shows an embodiment in which both the transverse opening and generally radial opening are rotated in yet another manner. Any combination of these various orientations of both the generally radial opening and transverse openings is within the scope of the present invention.

In an advantageous embodiment of the present invention, the transverse opening 24 intersects above the midpoint of the generally radial opening 22 where the relative motion of the airfoil sections is greater, resulting in improved damping. The transverse opening extends circumferentially through the blade a distance sufficient to provide adequate surface area for frictional damping in the transverse opening during operation. Accordingly, the transverse opening may extend completely through the airfoil 16 in the circumferential direction or may extend only partially through the airfoil in the circumferential direction. A transverse opening that extends only partially through the circumferential direction is advantageous in that it limits the flow of working fluid through the cavity. Passage of working fluid through the cavity reduces the amount of energy extracted from the working fluid. If the transverse openings extends only partially through the circumferential dimension of the airfoil, the opening into which the damper is inserted may intersect any surface of the airfoil below the tip 18, including the convex surface, concave surface, the leading edge 28 or trailing edge 29. In an advantageous embodiment of the present invention, the transverse opening intersects the high pressure, or concave, surface of the airfoil. The pressure further seats the damper within the damper cavity.

Placed within the cavity of each blade is a damper 30, shown in FIG. 4, with a cross section complementary with that of the cavity 20. No portion of the damper extends into the path of the working fluid. As stated previously, the preferred cross section is generally cross-shaped but may assume various shapes. The damper is constructed of any suitable damping material, such as metal and may be a single piece or several pieces.

The damper generally consists of a transverse portion 32, a lower radial portion 34, and an upper radial portion 36. The upper and lower radial portions reside within the elongated radial opening. The upper radial portion and lower radial portion are designed to reduce the flow of working fluid through the cavity. Flow of the working fluid through the cavity reduces the fluid flow across the surface of the blade and, therefore, the efficiency of the blade. Therefore, both radial portions of the damper have a cross section complementary with the cross section of the cavity's generally radial opening and are sufficiently thick, approximately 0.010 inches thick or greater, to reduce flow of the working fluid through the cavity.

The transverse portion 32 of the damper 30 resides within the transverse opening and also has a cross-section complementary with the cross section of the cavity 20. If the transverse portion of the damper extends through the entire circumferential dimension of the blade, the cross-sectional area of the transverse portion limits flow of the working fluid through the cavity. The thickness of the transverse portion is designed to provide adequate surface area for functional damping, approximately 0.010 inches thick or greater, to limit the dynamic stresses on the blade during operation.

During operation, fluid forces induce vibratory stresses on the two airfoil sections 26. The damper 30, particularly the transverse portion 32 of the damper, will reduce the magnitude of the motion occasioned by the vibratory stresses through frictional contact with the blade sections. This will in turn reduce the magnitude of the dynamic stresses on the blade as a whole, thereby increasing the operational life of the blade.

The damper 30 is restrained from excessive movement or separation from the blade during operation. Movement of the damper in the radial direction is limited by the transverse portion 32 of the damper itself. In addition, the damper may include a lug 38, a section of the radial portion of the damper with an enlarged cross section, residing within a correspondingly larger cross section of the generally radial opening. Although shown in FIG. 4 at the radially inward end of the damper, the lug may be located anywhere on the lower radial portion 34 or upper radial portion 36 of the damper, below the tip 18 of the airfoil. Movement of the damper in the circumferential direction during operation is limited by a locking tab (not shown) carried by the upper radial portion 36 of the damper. As shown in FIG. 5, this locking tab engages with a locking recess 40, defined by the tip of the airfoil, thereby limiting circumferential movement of the damper. Similar retaining means, such as retaining pins, are well known in the art and within the contemplated scope of the present invention. As previously addressed, damper cavities in which the transverse opening 24 extends only partially through the circumferential dimension of the airfoil 16, are further restrained by the high pressure working fluid forcing the damper against the far wall of the transverse opening. The damper is constrained from movement in a direction parallel to the axis of rotation by the blade sections surrounding the damper, which are connected to the disk.

Because the present invention does not require the addition of shrouds or chambers to house the damper, it is well suited to retrofit existing rotor blades, particularly blisk blades. The retrofit is easily performed by making radial and transverse cuts in the blade as described above and manufacturing a complementary damper.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An airfoil portion of a blade on a rotor assembly with an axis of rotation, said airfoil portion comprising:
   a tin portion radially distal from said axis of rotation:
   a body defining a cavity opening through at least said tip portion, said cavity separating the body into at least two airfoil sections; and
   a damper inserted into said cavity to limit relative motion between said airfoil sections during operation of said rotor assembly, thereby limiting vibratory stress on said blade.

2. The airfoil portion of the blade of claim 1, wherein said body includes at least one upper surface, at least one concave surface, at least one convex surface, at least one leading edge and at least one trailing edge.

3. The airfoil portion of the blade of claim 1, wherein said damper is one piece.

4. The airfoil portion of the blade of claim 1, wherein said damper is metallic.

5. The airfoil portion of the blade of claim 1, wherein said damper includes a lug for retaining said damper in said cavity.

6. The airfoil portion of the blade of claim 1, wherein said damper is cross-shaped.

7. An airfoil portion of a blade on a rotor assembly comprising:
   a body defining a cavity opening through an exterior surface thereof, said cavity defining at least two airfoil sub-port-ions of said airfoil;
   wherein said body defines said cavity to have an elongated radial opening extending circumferentially across said upper sax-face and between said convex surface and said concave surface of said airfoil portion;
   said body including at least one upper surface, at least one concave surface, at least one convex surface, at least one leading edge and at least one trailing edge; and
   a damper inserted into said cavity to limit relative motion between said airfoil sub-portions during operation of said rotor assembly, thereby limiting vibratory stress on said blade.

8. The airfoil portion of the blade of claim 7, wherein said body has a height in a radial direction, and said body defines said elongated radial opening to extend radially inward from said upper surface for a distance exceeding fifty percent of the height of said body.

9. The airfoil portion of the blade of claim 7, wherein said elongated radial opening extends circumferentially across said upper surface and between said concave surface and said convex surface of said airfoil portion.

10. The airfoil portion of the blade of claim 7, wherein said elongated radial opening extends axially across said upper surface and between said leading edge and said trailing edge of said airfoil portion.

11. The airfoil portion of the blade of claim 7, wherein said body defines said elongated radial opening to be coplanar with a plane of rotation of said rotor assembly.

12. The airfoil portion of the blade of claim 7, wherein said body defines said elongated radial opening to offset no more than forty-five degrees from a plane of rotation of said rotor assembly.

13. The airfoil portion of the blade of claim 7, wherein said body defines said cavity to also have an elongated transverse opening transverse to and intersecting said elongated radial opening and intersecting at least one surface of said body.

14. The airfoil portion of the blade of claim 13, wherein said body defines said elongated transverse opening to be in a plane parallel with an axis of rotation of said rotor assembly.

15. The airfoil portion of the blade of claim 13, wherein said body defines said elongated transverse opening to be offset no more than forty-five degrees from an axis of rotation of said rotor assembly in at least one plane.

16. The airfoil portion of the blade of claim 13, wherein said body defines said elongated transverse opening to intersect said elongated radial opening above a midpoint of said elongated radial opening.

17. The airfoil portion of the blade of claim 13, wherein said body defines said elongated transverse opening to extend only partially through said airfoil in at least one dimension.

18. The airfoil portion of the blade of claim 13, wherein the portions of said damper above said elongated transverse opening and below said elongated transverse opening have a thickness sufficient to limit fluid flow through said cavity.

19. The airfoil portion of the blade of claim 13, wherein the portion of said damper within said elongated transverse opening has a thickness sufficient to provide adequate frictional damping.

20. A damped rotor assembly comprising:
a shaft which rotates about an axis of rotation;
a disk on said shaft;
a plurality of blades extending radially outward from said disk at angularly spaced locations;
said blades having an airfoil portion which includes a tin portion radially distal from said axis of rotation;
said airfoil portion having a body defining a cavity opening through least said tip portion of said airfoil;
said cavity separating the body into at least two airfoil sections; and
a damper inserted into said cavity to limit relative motion between said airfoil sections during operation of said rotor assembly, thereby limiting vibratory stress on said blade.

21. A method of damping vibrations in a blade of a rotor assembly comprising:
providing an airfoil portion of said blade having a body that defines a cavity that opens through the tip portion of said airfoil portion radially distal from the axis of rotation of said rotor assembly; said cavity separating said body into at least two airfoil sections;
providing a damper in said cavity;
rotating the rotor assembly including the blade; and
limiting relative motion between said airfoil sections during rotation of said rotor assembly, thereby limiting vibratory stress on said blade.

* * * * *